Sept. 25, 1928.

E. A. WHITE 1,685,207

SIZING APPARATUS

Filed Nov. 10, 1926    4 Sheets-Sheet 1

INVENTOR
Edward A. White
BY
Carl H. Crawford
ATTORNEY

Sept. 25, 1928.

E. A. WHITE

SIZING APPARATUS

Filed Nov. 10, 1926 4 Sheets-Sheet 2

Inventor:
Edward A. White
by Carl H. Carford
Atty

Sept. 25, 1928.

E. A. WHITE

SIZING APPARATUS

Filed Nov. 10, 1926

INVENTOR
Edward A. White
BY
Carl H. Crawford
ATTORNEY

Patented Sept. 25, 1928.

1,685,207

UNITED STATES PATENT OFFICE.

EDWARD A. WHITE, OF LEWISTON, IDAHO.

SIZING APPARATUS.

Application filed November 10, 1926. Serial No. 147,505.

This invention relates to improvements in fruit sizing machines.

Some classes of fruit, especially apples, are substantially spherical irrespective of their size or kind. In other words, there is such a small difference between their diametrical dimensions that they are classed as spherical fruit. Such fruit as lemons and some kinds of prunes and plums have an axial dimension in such excess of their diameters that they are classed as elongated fruit.

Now it is a primary object of this invention to accurately size the spherical and elongated classes of fruit in such a manner that various sizes of the same may be segregated.

It is a feature of this invention to provide means for positively sizing fruit in single and separated entities thereof irrespective of their size, weight or shape.

It is a further feature to size fruit of various grades in such a manner that the different sizes of one grade will be deposited at predetermined points of deposition for such grade, and that all the sizes of other grades will be deposited at predetermined points of deposition for such grades, all the fruit of the different grades being segregated when leaving the machine.

It is a further feature of my invention to provide individual sizing devices for each fruit entity handled, and, in the case of spherical fruit, it is a feature to provide the sizing devices with a plurality of sizing members arranged in such a novel manner as always to occupy a parallelogram relation irrespective of the operative relation of the relatively movable sections of which the sizing devices are composed. Thus, irrespective of the position of a fruit entity in such device, such entity will not be sizingly discharged therefrom until the device reaches that exact point where such sized fruit should be discharged.

It is a further feature of my invention to provide delivery means for advancing the fruit toward the sizing machine, and it is a special feature to provide a transfer device for individually transferring fruit entities from said delivery means to the individual sizing devices in timed synchronism with the movement of said devices.

A further feature consists in providing said timing transfer device with means acting as an abutment to prevent advance of the fruit by said delivery means while said transfer device is functioning so that said device will perform a controlling function in addition to a transferring function.

In dealing with elongated fruit, it is a feature of my invention to deliver such fruit with the longitudinal axis thereof coincident with the path of travel of such fruit not only as such fruit approaches the sizing machine, but in the transfer to said machine, and also in its location in the sizing devices thereof.

My invention has many other objects and features which will be more fully described in connection with the accompanying drawings and which will be more particularly pointed out in and by the appended claims.

In the drawings:

Fig. 2, is a plan view with the delivery conveyor means omitted.

Like characters of reference designate similar parts throughout the different figures of the drawings.

I will first describe the preferred form shown in Figs. 1 to 12, and reference will first be made to the fruit delivery means.

Figure 1:
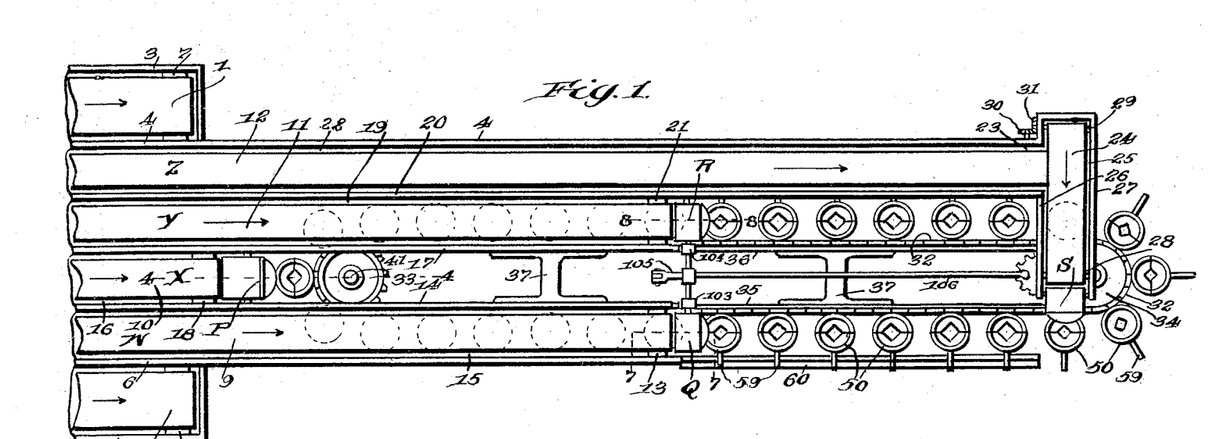
Fig. 1, is a plan view of the preferred form of my improved sizing machine.

The installation illustrated is one in which four grades of fruit are to be sized and I have shown outwardly disposed sorter belt conveyors 1 and 2 onto which the apples are disposed prior to being sorted, the belts 1 and 2, advancing the apples, or whatever fruit is being graded, to the right of Fig. 1. It will of course be understood that these conveyors have side walls 3, 4 and 5 and 6, respectively, and I have shown end rollers 7 and 8, suitably journalled, and over which the right hand bights of the belts are trained. Any suitable drive may be imparted from the remaining ends of said belts. Sorting operatives stand at various points along the outside of these conveyors 1 and 2, and grade the fruit by manually picking up fruit entities of different grades and depositing them on intermediately disposed grader belts which I will next describe.

I have shown grader belts 9, 10, 11 and 12, one for each grade of fruit. Belt 9, is trained over roller 13 and extends between walls 6 and 14, a suitable bottom wall being indicated at 15. Belt 10, runs on a bottom wall 16, between side walls 14 and 17 and over a roller 18. Belt 11, runs on a bottom wall 19, between side walls 17 and 20 and is trained over a roller 21. Belt 12, runs on bottom wall 22, between side walls 20 and 4, and is trained over a roller 23. Final delivery of fruit from belt 12, to the sizing machine, is made by a detour belt 24, travelling on a bottom 25, and between walls 26 and 27. One bight of said belt is trained over a roller 28 and the other end over a roller 29. As a means of driving belt 24, from belt 12, I have shown a bevel gear 30 on roller 23, which meshes with a similar beveled gear 31, on roller 29, to drive belt 24, in the direction of the arrow.

It may be stated, at this point, that while I have shown the grader belts all coming from one end of the installation, which is the usual arrangement, still, this is not essential, as if the conditions of installation are more favorable, certain of the belts may approach from the end opposite to the end shown.

It may also be informative to state that I will describe a sizing machine arranged and designed to segregate each of the grades of fruit on the four belts shown, into three sizes, although it will be understood that I have merely shown provision for four grades to illustrate the flexibility of the machine, and each grade may be sized into as many sizes as may be desired.

Reference will next be made to the sizing machine and its specific construction.

Figures 4, 5, 6, 11, 12, 13:
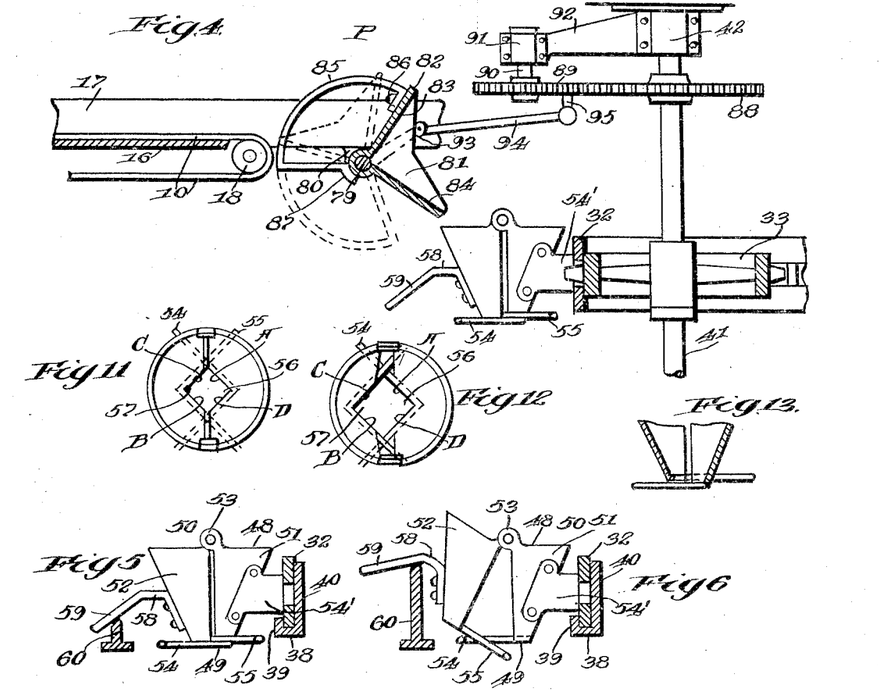
Fig. 4, is an enlarged sectional view, partly in elevation, taken on line 4—4 of Fig. 1.
Fig. 5, is a sectional view, partly in elevation, taken on line 5—5 of Fig. 2, and showing the sizing device closed.
Fig. 6, is a similar view taken on line 6—6 of Fig. 2, and showing the sizing device opened to release its fruit contents.
Fig. 11, is a plan view of one of the sizing devices showing the same in a closed position.
Fig. 12, is a similar view showing the same opened.
Fig. 13, is a vertical sectional view thereof.
Figure 6:
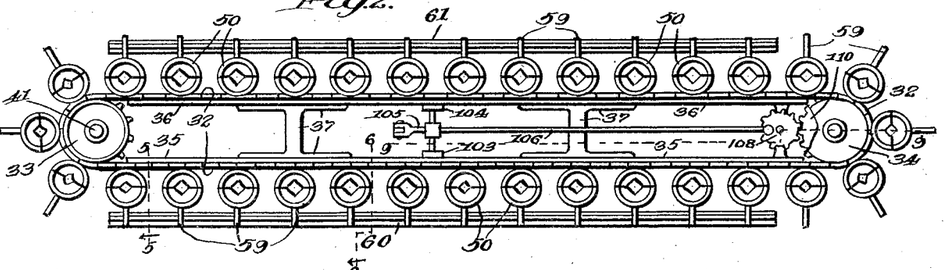

As illustrated, the sizing machine includes a carrier which is shown to be of the endless type that may advantageously take the form of a chain 32. The arrangement illustrated shows the chain 32 travelling in a horizontal plane about vertical axes, the chain being trained about a driving sprocket 33 and an idle sprocket 34. Between wheels 33 and 34, I have shown the laps of the chain 32 supported by guides 35 and 36, which may be suitably mounted on uprights 37. As the guides are both alike in form and function, only one need be described in detail. Each guide, as more clearly shown in Fig. 6, has a bottom guiding wall 38, an outer and relatively short wall 39 and an inner and relatively high wall 40, whereby the chain lap is held in the vertical posture shown in said figure, at points between wheels 33 and 34. It will be understood that the bight portions traversing the wheels will be held thereby, as illustrated in Fig. 4. I have shown wheel 33, mounted on shaft 41, which is journalled in bearings 42 and 43 and which may be driven by a chain 44, trained about wheel 45, on said shaft, with the shaft 41, turning in a contra-clockwise direction, viewing Fig. 2. Wheel 34, is shown mounted on shaft 46, which is shown journalled in a bearing structure 47.

Reference will next be made to my improved sizing devices with which the carrier 32 is equipped, and I will refer more particularly to Figs. 4 to 6 and 11 and 12.

Figure 3:
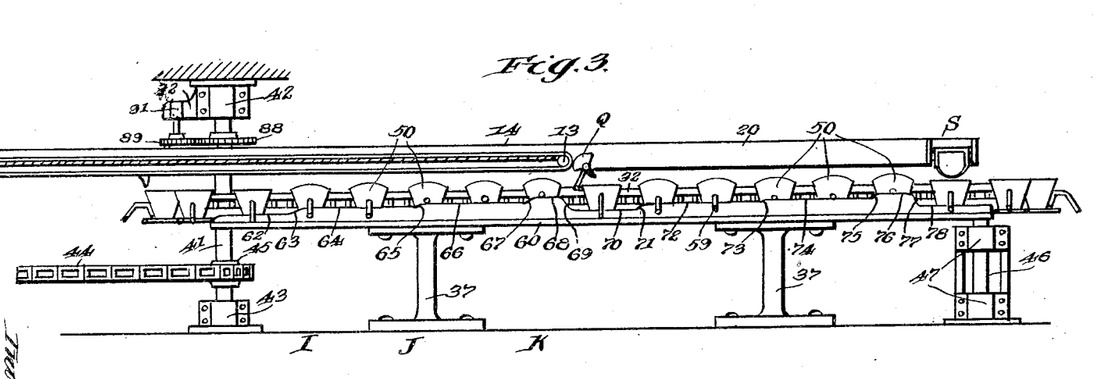
Fig. 3, is a view in side elevation of the machine shown in Fig. 1, with parts in section.

In this preferred form of the invention, I have shown said devices in the form of an inverted frustum of a cone, the larger intake or receiving end being generally indicated at 48 and the lower discharge end at 49, and I will generally indicate said devices by the numeral 50, to facilitate designation of the same in Figs. 1, 2 and 3, where they appear in small size. I have shown the devices vertically divided into sections 51 and 52, said sections being hingedly connected at 53, near their upper ends, whereby the lower ends may be actuated for the purpose of relative opening movement as will presently appear. Said sizing devices are mounted on the carrier chain 32, and in practice, I secure sections 51 thereto, as by means of brackets 54', suitably secured to chain 32 and to said sections. As will be seen from Fig. 2, the sizing devices are equi-distantly spaced peripherally about chain 32 so that as the chain is advanced, the sizing devices will be advanced in one direction about and with one lap of said chain, and in another direction about and with the other lap of the chain. With section 51, rigidly attached to chain 32, section 52 will be supported in a closed position, as shown in Fig. 5, partly by the hinged connection 53, and partly by sizing members which I will presently describe. At any rate, the movable section 52, is intended to close by gravity. The larger upper end of the cups or sizing devices 50, are proportioned so as to present an opening larger than the largest size fruit to be sized so that in any event, the fruit entity that is delivered, will descend into said cup 50 and be held and supported therein until released therefrom. Further, by reason of the convergence of the inwardly inclined walls of the cup 50, the danger of injury to the fruit entering the same will be to all purposes minimized to a nugatory extent. The lower end of the cup 50 has an opening smaller than the smallest size fruit to be sized, thereby insuring temporary retention of the fruit therein after the entity has once entered the same.

I will next describe in detail the means with which said sections are provided to accurately size the fruit.

This feature is embodied in the form of linear sizing rods, section 51 being provided with a pair indicated at 54, and section 52 being provided with a pair indicated at 55. It will be noted from Fig. 11, that when the cup sections 51 and 52 are closed, the lower opening formed in each section, and indicated at 56 and 57, are conjointly square and that this lower opening is formed wholly by the walls of the cup sections. Preferably at the lower margins of said walls, I may continue these rods 54 and 55, as shown in Fig. 13, so that these rods themselves, may form the lower marginal edges of the walls of the cup. As shown, the rods 54 are sufficiently lower than the rods 55, so that the latter can slidably engage the former either in the closed or open position of the cup. It will therefore be seen, that throughout the length of these sizing rods, there will be presented to the fruit entity a parallelogram A, B, C and D, irrespective of the extent of opening movement of said sections 51 and 52, as will be clearly seen by reference to Figs. 11 and 12. It will thus be seen, that irrespective of the position into which a spherical fruit entity enters the sizing cup 50, it will be accurately calipered by these four straight sizing edges so that corresponding to the extent of opening movement of the cup sections, only a correspondingly sized fruit entity will be released. As the sections open, the discharge opening will increase in size but the rods will always form a square opening through which the fruit must descend.

In the present construction, I have devised a novel means for operating the sizing devices which I will next describe in detail.

Owing to the fact that one section of each sizing cup is rigidly mounted to the carrier chain, opening movement of the cup is confined to the un-mounted or outer sections 52, as indicated in Fig. 6. However, this particular arrangement does not in any manner alter or modify the calipering of the fruit to be sized, as hereinbefore described, as the releasing opening is still in the form of a parallelogram even though opening movement is confined to one section. From this point on, it may be convenient to refer to the section 51 as the fixed or carrying section and to the section 52 as the movable or opening section. I provide each opening section 52, with a cam engaging rod 58 which projects outwardly from a line intersecting the hinged axis of the two sections 51 and 52. This rod 58 preferably is slightly declined from the horizontal, as clearly indicated at 59, in Fig. 5.

I provide an operating means for opening said sizing cups at predetermined points, which I will next describe in detail.

A cam rail 60 is disposed on the near side of the machine as shown in Fig. 3, and a like rail 61, is disposed on the far side, as shown in Fig. 2. As both rails are alike in function and form, the only distinction being that they are reversed in position, only one need be described in detail. It may be stated that these rails may be supported upon the standards 37, or in any other convenient manner. Referring to Fig. 3, it will be seen that the rail 60 has a starting or neutral section 62, onto which the rods 59 ride freely without tilting the sections 52 at all. Thus, the first cup 50, that has rounded the left hand bight of the carrier, will have its rod 59, in an overhanging position to the cam rail and will be ready for actuation thereby when a sufficiently advanced position has been reached. At 63, I have shown a rise in the cam 60 which forms the beginning of the first actuating section 64, of cam 60. This section 64 is of sufficient height to open the sizer cups 50 to a minimum extent for the smallest size apple to be released. An eminence 65, forms the beginning of the next section 66, which lifts the rods 59 sufficiently to open the sizing cups for release of apples of an intermediate size. An eminence 67, forms the start of the next section 68, of cam 60, which lifts the rods 59 sufficiently to open the sizing cups to the maximum for release of the largest size apple.

Thus far described, the cam rail 60, functions for sizing operation of the sizing cups for all sizes of what I will arbitrarily term grade X apples, which are fed by belt 10.

I will next describe that portion of cam rail 60, which functions for sizing operation of all apples of grade W, which are delivered by belt 9. Thus, from section 68, the rail declines at 69, to a neutral or non-operating section 70 at which point the cup or cups will be closed and ready to receive the fruit. A lift 71, is the beginning of the first section 72, like section 64, and a lift 73, starts a section 74, like section 66, while a lift 75, starts section 76, like section 68. A decline 77, leads to a neutral section 78 off which the rods retract just prior to rounding the right hand bight of the carrier, viewing Fig. 3.

The rail 61, will function in the same manner, and for the same group of cups that may be abreast of said rail, in the way just described, except that after the cups have reached the other side of the machine, they will be going in a different direction and the cam sections will be altered or reversed accordingly with no actual difference in operation. Thus, the first six cups on the far side of the machine will handle apples which I will call grade Z, and which are delivered over or on belts 12 and 24. The last six cups will handle apples which I will call grade Y, and which are delivered by belt 11. Thus it will be seen that the sizing function is being performed by all the cups on both sides at all times and that the only cups that are idle, as regards actual sizing, or getting into a position to size, are those cups which are rounding the bights of the carrier.

Now referring to the first six cups of Fig. 3, to the left thereof, that have fully rounded the left hand bight, and assuming that the first cup actuated by section 64, contains an apple of the largest size, well, such apple will not be released by cup opening movement of section 64. The apple will still remain in the cup until the cup has been actuated by section 68. If the first cup has the smallest size apple, it will be released just as soon as its rod 59 rides up lift 63. Thus, the points of actual release, will be just as the rods have ascended the particular lift or rise of the cam. It will thus be seen that the smallest size apples will be all dropped at point I, the intermediate at point J and the largest at point K. Thus irrespective of the indiscriminate order in which a grade of apples is delivered, and the delivery will always be indiscriminate unless mere accident operates to the contrary, the machine will always deliver one size of one grade at one predetermined point, another size of the same grade at another fixed point, and so on, keeping all the apples of the same grade, though of different sizes, segregated from apples of another grade. I have not shown any means or manner of receiving the apples from the points of delivery, by the cups, as such receiving means forms no part of the present invention. However, the machine may be operated in connection with a motion storage apparatus. In fact, it may be operated with great advantage in connection with any system where predetermined deposition of various sizes of a single grade of fruit is necessary.

I will next describe the novel means whereby the fruit entities are transferred from the delivery belts to the sizing cups in timed relation with the movement of the latter.

Reference will first be made to Fig. 4, showing the means for transferring fruit from belt 10, to the sizing cups. It may be stated that I have shown four of these transfer devices, one for each of the four delivery belts, and that all of these devices are substantially the same in form and function and the only description necessary of the remaining three, will relate to the mounting and driving of the same. Hence, to facilitate their location, I will generally designate all of the timing transfer devices as follows; P, Q, R and S.

As regards device P, shown in Fig. 4, the same includes an oscillatory shaft 79, which may be suitably journalled in hanger bearings 80, one being shown depending from wall 17. A transfer fruit receiver 81, is rigidly mounted on shaft 79 and is of a capacity large enough to receive the largest size fruit, and of course will receive the smallest and intermediate sizes. The upper edge 82, of the back wall 83, may be straight while the lower wall 84 may be transversely arched to more efficiently guide the contents onto a sizing cup. I have shown the receiver in a position which it would occupy when in the act of discharging an apple into one of the sizing cups. It will be seen that the extent of drop of the apple from the receiver into the sizing cup is very slight, hence no injury could result. In order to arrest the on-coming fruit while the transfer receiver has been rocked into the discharging position shown in Fig. 4, and while it is being returned to the receiving position shown in dotted lines in said figure, I provide the receiver with means which I will next described in detail. The said means is in the form of an abutment and I have shown an arcuate abutment 85, which may be a strip of metal bent on a radius of which the axis of shaft 79 is the center. Thus, the abutment is concentrically disposed about shaft 79. The ends 86 and 87 of the abutment strip 85, may be secured to the transfer receiver in the manner shown. This abutment 85, during oscillation of the transfer devices, does not push back the fruit, which of course would be objectionable, but it merely presents, to all intents and purposes, a fixed abutment which is always close to the end of the belt in any position the receiver may occupy other than a receiving position. In actual practice, the oscillation of the transfer device will necessarily be so rapid, in order to deliver to the successive sizing cups as fast as they come into registry with said receiver that the latter will be practically in constant motion except for the very slight periods attendant the reversal of motion from one direction to the other. Further, the speed of the belt 10 will be co-ordinated with the speed of the sizing cups and the rate of oscillation of the receiver so that no great excess of fruit can accumulate on the belt 10. If grade X should run short, as many times a grade does, the transfer device would oscillate empty and likewise the sizing cups fed by said device would be empty. Further, it often happens that while a grade does not actually run short, it does run slack, and then alternate or perhaps more sizing cups would not be charged, but that does not affect the operation.

As a means of operating the transfer device, I have shown a gear 88, on shaft 41, which meshes with a smaller gear 89, mounted on shaft 90, journalled in bearing 91, which latter is secured to bearing 42 by bracket 92. An arm 93, fixed on shaft 79, is connected by a link 94, with a stud 95, on gear 89. and the connections are such as to afford sufficient play so that when gear 89 is rotated, oscillating movement will be imparted to the receiver 81, as will now be clear. However, this particular operating means is not an essential form although it is desirable to take driving power from an element that is in fixed relation to the carrier.

Figures 7, 8:
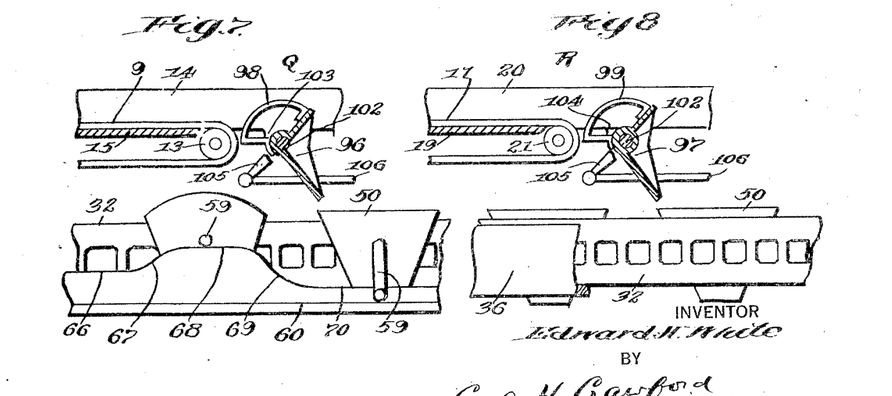
Fig. 7, is a sectional view on line 7—7 of Fig. 2, showing one delivery means.
Fig. 8, is a sectional view on line 8—8 of Fig. 2.

The transfer devices Q and R, as shown in Figs. 7 and 8, are in all respects the same as device P, just described, the same having receivers 96 and 97, and abutments 98 and 99, respectively. The device Q, is at the delivery end of belt 9, and delivers to cups 50, when the latter reach section 70, of cam rail 60, which is a neutral or charging section of said rail. Thus, the last six cups 50, on the right hand side of the sizing machine, and which are operated by sections 70 to 78, take care of sizing grade W, and deposit fruit in cups 50 which are travelling to the right of Figs. 1 and 3. The device R, which is at the end of belt 11, delivers to cups 50 travelling to the left of Figs. 1 and 3. This device R, as well as device Q, are mounted on a common rock or oscillating shaft 102 which may be journalled in bearings 103 and 104, mounted on guides 35 and 36, respectively. An operating arm 105, mounted on shaft 102, is connected by a link 106, with a stud 107 (see Fig. 9) mounted on a gear wheel 108. This wheel 108 is suitably journalled at 109 and meshes with a gear 110, mounted on shaft 46. Thus, both the devices Q and R, are driven from shaft 46, which arrangement, as before stated, insures synchronic action of the devices and the cups 50.

Figure 9:
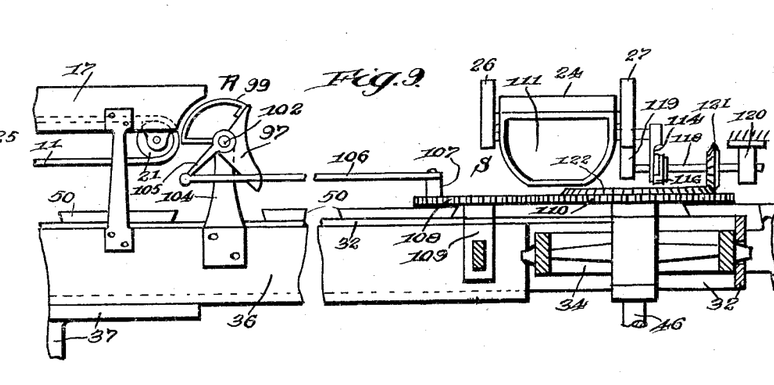
Fig. 9, is a sectional view on line 9—9 of Fig. 2.
Figure 10:
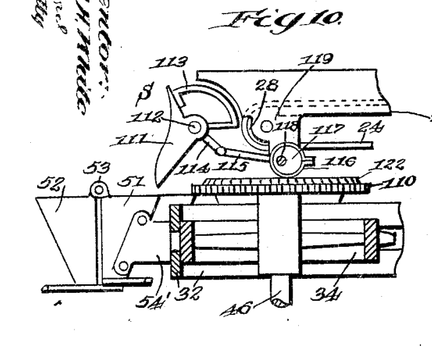
Fig. 10, is a view looking from the right of Fig. 9.

I will next describe device S, and will refer to Figs. 9 and 10.

The device S, includes a receiver 111 mounted on rock shaft 112 which is journalled in suitable bearings on walls 26 and 27. This device has the same kind of abutment 113 which operates abreast of the end of belt 24, as have the other devices. An operating arm 114, is mounted on rock shaft 112 and is connected by a link 115, with the strap 116, of an eccentric 117, which is mounted on a shaft 118. Said shaft 118 is journalled in bearings 119 and 120 and carries a bevel gear 121 which meshes with a like gear 122, formed on wheel 110. It will now be clear that all of the transferring devices are driven in constant speed relation to the carrier chain 32.

It will now be clear that each grade of fruit is delivered, one by one, as regards the fruit entities, to an independent or individual group of sizing cups 50, and that each grade is segregated into three sizes, and that the entities of the sized grades are delivered by the cups 50, in predetermined order at predetermined fixed points. It will also be seen that by varying the cam formation of the cam rails, a different kind of sizing, and a different kind of delivery may readily be effected. Instead of sizing to three sizes, a lesser number may be employed, or even a greater number of sizes, without otherwise varying the machine, the latter may be materially altered in the performance of its functions.

Figures 14, 16:
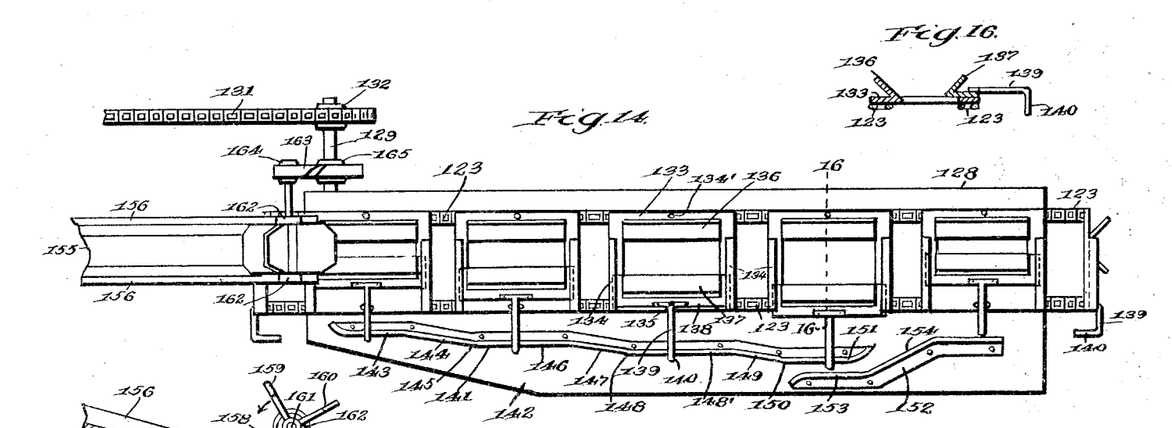
Fig. 14, is a plan view of a modified form of my invention which is shown equipped for sizing elongated fruit.
Fig. 16, is a sectional view on line 16—16 of Fig. 14.
Figure 15:
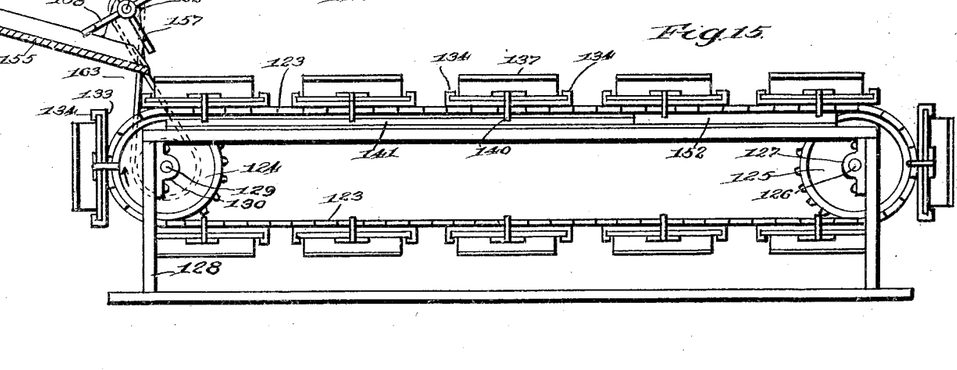
Fig. 15, is a view in side elevation thereof.

I will next refer to the modified form shown in Figs. 14 and 15 which is especially designed for sizing fruit of elongated form such as lemons and like shaped fruit.

In this form of the invention, I employ companion carriers preferably in the form of chains 123 which are trained about sprocket wheels 124 and 125, there being two of such wheels at each bight of the chains. Wheels 125 are mounted on shaft 126, which is suitably journalled in bearings 127, mounted on the frame of the machine, which I will generally designate at 128. Wheels 124 are mounted on shaft 129, journalled in bearings 130, which are mounted on the frame 128. Shaft 129 is the drive shaft and power may be applied to drive the same by means of a chain 131, trained over a sprocket wheel 132, on said shaft. It will be seen that the wheels 124 and 125 rotate about horizontal axes and hence the two laps of the chains are in superposed relation, instead of in horizontal relation, as in the preferred form. Further, those sizing devices, to be presently described, and which are on the lower lap of the chains, are inactive, and only those on the upper laps are active.

I will next describe the improved sizing devices that I employ on this type of the invention.

As all are alike in structure and function, only one sizing device need be described in detail. Each sizing device comprises a base plate 133 having guiding side members 134 and anchorage to the chains will be at points centrally of the length of said devices, as indicated at 134' and 135, to facilitate negotiation of said devices around the wheels 124 and 125. The base 133 is provided with an elongated and suitably inclined fruit holding member 136, which is fixed thereto. A companion and movable fruit holding member is designated at 137 mounted on a slide 138 which is movable in said guides 134, toward and away from member 136. Between said members, the base 133 is open, for passage therethrough of the fruit entities when the latter are released by said members 136 and 137. Each slide 138, is provided with a cam operated rod 139, having a bent end 140.

I will next describe one manner and means for operating said devices.

An operating cam rail 141, is suitably secured to the frame platform 142 and has a starting or neutral section 143, which is so disposed that when a sizing device rounds wheels 124 the bent end 140, will take the position shown in Fig. 14, adjacent section 143. In this position, the members 136 and 137 are close enough toward each other to hold the smallest size fruit entity. As the sizing devices on the upper lap move to the right of Fig. 14, the end 140 will encounter an actuating section 144, which, at its apex 145, will actuate member 137 sufficiently to release the smallest size entity. Following said actuating section 145, is a non-actuating section 146, which will not further actuate member 137 but will permit the device to advance without further changing its adjustment. This section 146 is followed by an actuating section 147, at the apex 148 of which the member 137 will be moved a sufficiently further extent to release an intermediate size entity. This is followed by a non-acting section 148', and finally by an actuating section 149, at the apex 150 of which, the member 137 is actuated to release the largest size entity. The section 149' is followed by a non-acting section 151. A return cam rail 152 has a section 153, between which and section 151, the bent end rides, and said return cam has a following section 154, which acts to return the member 137 to an initial inner position of adjustment so that when such sizing device reappears at the beginning of its travel, at the left hand end of the machine, viewing Fig. 14, the members 136 and 137 will occupy a relatively closed adjustment or position. It will be understood that there will be enough friction in the sliding parts to retain the members in their relatively adjusted positions irrespective of the jar and vibration to which the devices may be subjected.

I will next describe the manner and means of feeding the fruit entities to said sizing devices.

I have shown a downwardly inclined trough 155 having laterally inclined walls 156 shaped and proportioned with a view of retaining elongated fruit entities with their longitudinal axes coincident with their path of travel along the trough or chute 155. Should it be desired, the fruit may be advanced by means such as a belt, as shown in the preferred construction. I have shown transfer means in the form of a rotary bladed wheel having blades 157, to 160, said wheel being mounted on a shaft 161, journalled in bearings 162. Shaft 161 is shown driven by a belt or chain 163, trained over wheels 164 and 165, mounted, respectively, on shafts 161 and 129, whereby rotary motion will be imparted to the transfer wheel in timed relation to the rate of travel of the sizing devices.

As a sizing device reaches an upper position after rounding wheels 124, the blades 157 and 158 will quickly advance a fruit entity into the device. As the members 136 and 137, of said devices form elongated receivers for the fruit entities, it will be seen that the latter will always be held with their longitudinal axes in line with their direction of travel. Now the importance of this feature in connection with elongated fruit is that anything like accurate measurement by the sizing members 136 and 137, would be impossible unless such measurement was taken transversely of the longitudinal axis of such fruit. In the case of fruit which is substantially spherical, which the preferred form was designed to deal with, the fruit entities can enter the sizing devices in any position, and accurate sizing can be obtained, but it will now be clear that it is otherwise with elongated fruit.

In the form of the invention shown in Figs. 14 and 15, whatever means was designed to receive the fruit after the latter had been released and dropped from the sizing devices, would be disposed between the upper and lower laps of the chains 123.

It will be seen that in each form of the invention, I feed and size the fruit entities individually, always keeping them separated throughout the operation.

It will now be clear that in each form of the invention the fruit entities are positively manipulated, as much so as if they were co-acting elements of the machine, and this positive action is carried out wholly in the absence of friction, the relative or varying weight, or the velocity of movement of the entities.

It is now believed that the device of my invention will be fully understood as regards both structure and operation, and while I have herein shown specific forms of my invention, I do not wish to be limited thereto except for such limitations as the claims may import.

I claim:

1. In a fruit sizing machine, a travelling carrier having a series of fruit sizing cups and each cup comprising a section fixed to said carrier and a companion section hinged to said fixed section and closable thereagainst by gravity, and cam means for opening said movable sections.

2. In a fruit sizing machine, a travelling carrier having a series of fruit holding sizing devices each comprising a conical cup divided into fixed and movable sections hingedly connected near their upper ends, one section being fixed to said carrier and the free section being movable by gravity into a closing position, and said movable section having a cam rod, and a cam for lifting coaction with said rods to move said free sections into opening positions.

3. In a fruit machine of the class described, a carrier having a series of fruit sizing devices each comprising a cup receiver composed of sections relatively openable, and said sections having mutually sliding linear sizing members disposed in parallelogram relation irrespective of the extent of open or closed positions of said sections.

4. In a fruit machine of the class described, a carrier having a series of fruit sizing devices each comprising a receiver composed of pivotally united sections relatively openable, and said sections having mutually coacting linear sizing members disposed in parallelogram relation irrespective of the extent of opening or closing movement of said sections.

5. In a fruit machine of the class described, a carrier having a series of fruit sizing devices each comprising a receiver composed of pivotally united sections relatively openable, and said sections having sizing rods in overhanging coacting relation and disposed in parallelogram relation irrespective of the extent of opening or closing movement of said sections.

In testimony that I claim the foregoing as my own, I hereby affix my signature.

EDWARD A. WHITE.